Patented July 12, 1927.

1,635,675

UNITED STATES PATENT OFFICE.

MATHEW P. IDING AND WILLIAM A. NIMTZ, OF MILWAUKEE, WISCONSIN; SAID NIMTZ ASSIGNOR TO SAID IDING.

COMPOSITION.

No Drawing.  Application filed April 1, 1925. Serial No. 19,973.

The invention relates to grinding compositions, and particularly to a composition and the method of making and applying it to grinding discs.

It is an object of the invention to provide an improved composition which retains its abrasive properties for a relatively long period.

A further object of the invention constitutes the provision of a compound which will not be impaired in its grinding efficiency by the process of dust collecting thereon during the grinding operation.

A further object comprises the provision of a composition which may be preserved for an indefinite length of time, without losing its properties.

A further object of the invention is to provide an improved composition that can be furnished in a semi-solid form and be directly applied to a steel surface or the like without a fabric backing.

A further object of the invention is to provide an improved composition which will permit the carborundum points to protrude beyond the surface of the binding compound thus making accessible the desirable cutting surface of the carborundum to engage the article being ground or polished.

A further object of the invention is to provide an improved composition which does not require being baked but simply needs only to be exposed to a drying temperature of 90° F.

With these and other objects in view which will become apparent upon a perusal of the following specification taken in connection with the claims forming a part thereof; the preferred composition comprises the particular ingredients used in proper proportion to meet the most exacting requirements, which include the following: asbestos retort cement, carborundum, silica of soda and water.

In compounding these ingredients the following procedure has given the best results:

To Number 40 asbestos retort cement supplied to the trade as such, and known as such, a suitable quantity of carborundum is added and the whole mixed with silica of soda and water to constitute a heavy mass, resembling wet sand. This mixture is applied to the surface of a steel disc which is later to be employed in the grinding operation of surfaces and then subjected to a drying temperature of about 90° F. During this drying process the grinding materials contract so that the short carborundum points will portrude beyond it. This condition is very advantageous as the cement dust thus freed during the grinding action would settle on the grinding disc will not then impair the efficient grinding action thereof.

Instead of using carborundum a suitable quantity of aloxite may be employed. The composition is usually packed in air tight cans where it may be maintained for an indefinite period of time in proper condition, or the composition may be furnished in disc form known to the trade as "glue bond form" in which case a canvas or other fabric baked disc of the improved composition is made up ready to be fastened to the steel disc. In preparing the composition the following preferred proportions of ingredients are chosen: 3½ lbs. Number 40 asbestos retort cement in dry form, 16 lbs. of carborundum, 1 gallon of silica of soda and water sufficient to yield a heavy mixture.

If aloxite is used instead of carborundum the following proportions are preferred: 3½ lbs. of retort cement, 18 lbs. of aloxite, 1 gallon of silica of soda and water sufficient to yield a heavy mixture.

While the specification refers to certain ingredients used in suitable proportions the equivalents of such ingredients and variations in the proportions used may be changed within the scope of the invention as defined by the appended claims.

We claim:

1. A new combination of matter comprising retort cement, carborundum, silica of soda and water.

2. A new combination of matter comprising Number 40 asbestos retort cement, carborundum, silica of soda and water.

3. A new combination of matter comprising retort cement, carborundum, silica of soda and water, said composition having the carborundum points protruding after drying.

4. As a new article of manufacture a product composed of retort cement, carborundum, silica of soda and water, the whole being baked on fabric in the form of a disc.

5. A new composition of matter comprising 3½ lbs. of retort cement, 16 lbs. of carborundum, 1 gallon silica of soda and water sufficient to produce a heavy mixture.

6. A new composition of matter comprising retort cement, carborundum, silica of soda and water, said composition being dried at a temperature of about 90° F.

7. The process of forming a grinding composition, which comprises mixing a quantity of cement with an abrasive substance, then combining silica of soda and water in proper proportion to form a heavy mixture, then applying the mixture thus obtained in plastic state to a metal foundation, such as a steel disk, and then subjecting the mixture so applied to a drying temperature of 90° F. to cause the binding substance to contract and cause the abrasive material to protrude.

8. The process of forming an abrasive substance, comprising combining 3½ lbs. of retort cement, then adding 16 lbs. of carborundum, then adding 1 gallon of silica of soda and water sufficient to produce a heavy mixture, and subjecting the whole mixture to a drying temperature of 90° F. to contract the binder and cause the carborundum to protrude.

In testimony whereof, I affix my signature at 115 Grand Ave., Milwaukee, Wisconsin.

MATHEW P. IDING.
WILLIAM A. NIMTZ.